US011463273B2

(12) United States Patent
Li et al.

(10) Patent No.: US 11,463,273 B2
(45) Date of Patent: Oct. 4, 2022

(54) UNIVERSAL INTERFACE FOR SENSOR DEVICES

(71) Applicant: Intel Corporation, Santa Clara, CA (US)

(72) Inventors: Tianyou Li, Shanghai (CN); Christopher Elford, Hillsboro, OR (US); Qi Zhang, Santa Clara, CA (US); Junyong Ding, Shanghai (CN); Shu Xu, Shanghai (CN); Gang Shen, Hillsboro, OR (US); Hassnaa Moustafa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/495,426

(22) Filed: Oct. 6, 2021

(65) Prior Publication Data

US 2022/0209980 A1    Jun. 30, 2022

Related U.S. Application Data

(63) Continuation of application No. 15/775,423, filed as application No. PCT/CN2015/098653 on Dec. 24, 2015, now Pat. No. 11,146,416.

(51) Int. Cl.
*H04L 12/28* (2006.01)
*G06F 9/451* (2018.01)
(Continued)

(52) U.S. Cl.
CPC ...... *H04L 12/2814* (2013.01); *G06F 9/44526* (2013.01); *G06F 9/451* (2018.02);
(Continued)

(58) Field of Classification Search
CPC ............... H04L 12/2814; H04L 12/281; H04L 41/22; H04L 69/08; H04L 2012/2841; G06F 9/451; G06F 9/44526
(Continued)

(56) References Cited

U.S. PATENT DOCUMENTS

| 6,718,372 B1 | 4/2004 | Bober |
| 8,997,121 B2 | 3/2015 | Trethewey et al. |

(Continued)

FOREIGN PATENT DOCUMENTS

| CN | 102736578 A | 10/2012 |
| CN | 104168182 A | 11/2014 |
| WO | WO-2017107123 A1 | 6/2017 |

OTHER PUBLICATIONS

U.S. Appl. No. 15/775,423 U.S. Appl. No. 11/146,416, filed May 11, 2018, Universal Interface for Sensor Devices.
(Continued)

*Primary Examiner* — Melvin H Pollack
(74) *Attorney, Agent, or Firm* — Schwegman Lundberg & Woessner, P.A.

(57) ABSTRACT

This disclosure is directed to a universal interface for sensor devices. Applications executed in a device may interact with sensor devices via a universal interface. For example, the device may act as a gateway allowing Internet of Things (IoT) devices to interact with at least one resource external to the environment in which the IoT devices operate. The device may comprise at least memory circuitry to store at least a virtual file system and at least one application. The virtual file system may provide a programmatic interface through which at least one sensor device may be accessible to the at least one application. Processing circuitry in the device may execute an application from those stored within the memory circuitry. The application, when executed, may cause interconnect circuitry also in the device to at least one
(Continued)

of transmit instructions to, or receive data from, a sensor device utilizing the virtual file system.

25 Claims, 5 Drawing Sheets

(51) Int. Cl.
   *H04L 69/08*     (2022.01)
   *H04L 41/22*     (2022.01)
   *G06F 9/445*     (2018.01)

(52) U.S. Cl.
   CPC .......... *H04L 12/281* (2013.01); *H04L 41/22* (2013.01); *H04L 69/08* (2013.01); *H04L 2012/2841* (2013.01)

(58) Field of Classification Search
   USPC .......................................................... 709/223
   See application file for complete search history.

(56) References Cited

U.S. PATENT DOCUMENTS

| | | | |
|---|---|---|---|
| 9,021,143 B2 | 4/2015 | Chandrasekaran et al. | |
| 9,405,566 B2 | 8/2016 | Chawla et al. | |
| 9,514,154 B2 | 12/2016 | Garimella et al. | |
| 9,538,263 B2* | 1/2017 | Bister | G01D 21/00 |
| 9,560,145 B2* | 1/2017 | van der Beek | H04L 65/65 |
| 9,629,193 B2 | 4/2017 | Erickson et al. | |
| 9,703,582 B1 | 7/2017 | Chigurapati et al. | |
| 9,762,563 B2 | 9/2017 | Davis et al. | |
| 9,817,832 B1 | 11/2017 | Protopopov et al. | |
| 9,843,886 B2 | 12/2017 | Guedalia et al. | |
| 9,847,964 B2 | 12/2017 | Logue | |
| 9,866,445 B2 | 1/2018 | Douville et al. | |
| 10,061,660 B1 | 8/2018 | Jagannatha et al. | |
| 10,069,918 B2 | 9/2018 | Harter et al. | |
| 10,149,335 B2 | 12/2018 | Gujral et al. | |
| 10,275,175 B2 | 4/2019 | Bandic et al. | |
| 10,310,696 B1 | 6/2019 | Taylor | |
| 10,469,581 B2 | 11/2019 | Amit et al. | |
| 10,541,916 B2 | 1/2020 | De et al. | |
| 11,146,416 B2* | 10/2021 | Li | G06F 9/451 |
| 2001/0047400 A1 | 11/2001 | Coates et al. | |
| 2006/0047704 A1 | 3/2006 | Gopalakrishnan | |
| 2006/0123064 A1 | 6/2006 | Kim et al. | |
| 2006/0195613 A1 | 8/2006 | Aizu et al. | |
| 2011/0167435 A1 | 7/2011 | Fang | |
| 2013/0227569 A1* | 8/2013 | Kohli | G06F 9/45558 718/1 |
| 2014/0266592 A1* | 9/2014 | Dahl | H04W 88/16 340/5.71 |
| 2015/0063166 A1* | 3/2015 | Sif | G06F 9/541 455/418 |
| 2015/0189005 A1* | 7/2015 | Dubois | H04L 63/0407 709/217 |
| 2015/0263886 A1* | 9/2015 | Wang | H04L 41/08 370/254 |
| 2015/0301521 A1* | 10/2015 | Byron | G05B 19/4183 700/108 |
| 2016/0087933 A1* | 3/2016 | Johnson | H04W 12/50 709/245 |
| 2016/0135241 A1* | 5/2016 | Gujral | H04W 76/14 370/328 |
| 2016/0162588 A1* | 6/2016 | Tuchman | G06F 16/9535 707/722 |
| 2016/0182432 A1* | 6/2016 | De | H04L 69/28 709/204 |
| 2016/0306583 A1 | 10/2016 | Yun et al. | |
| 2017/0004131 A1 | 1/2017 | Ben Dayan et al. | |
| 2017/0052513 A1* | 2/2017 | Raji | H04L 67/55 |
| 2017/0078158 A1* | 3/2017 | Dec | G06F 11/30 |
| 2017/0134497 A1* | 5/2017 | Harter | G01N 33/0004 |
| 2017/0171692 A1* | 6/2017 | Shinohara | H04W 4/70 |
| 2018/0013579 A1* | 1/2018 | Fairweather | H04L 41/022 |
| 2018/0351761 A1 | 12/2018 | Li et al. | |

OTHER PUBLICATIONS

"U.S. Appl. No. 15/775,423, Advisory Action dated Jan. 19, 2021", 5 pgs.

"U.S. Appl. No. 15/775,423, Final Office Action dated Oct. 30, 2020", 15 pgs.

"U.S. Appl. No. 15/775,423, Non Final Office Action dated Apr. 1, 2020", 14 pgs.

"U.S. Appl. No. 15/775,423, Notice of Allowability dated Jun. 30, 2021", 3 pgs.

"U.S. Appl. No. 15/775,423, Notice of Allowance dated Jun. 15, 2021", 10 pgs.

"U.S. Appl. No. 15/775,423, Preliminary Amendment filed May 11, 2018", 7 pgs.

"U.S. Appl. No. 15/775,423, Response filed Feb. 8, 2021 to Advisory Action dated Jan. 19, 2021", 11 pgs.

"U.S. Appl. No. 15/775,423, Response filed Jul. 31, 2020 to Non Final Office Action dated Apr. 1, 2020", 11 pgs.

"U.S. Appl. No. 15/775,423, Response filed Dec. 23, 2020 to Final Office Action dated Oct. 30, 2020", 12 pgs.

"International Application Serial No. PCT/CN2015/098653, International Preliminary Report on Patentability dated Jul. 5, 2018", 5 pgs.

"International Application Serial No. PCT/CN2015/098653, International Search Report dated Sep. 30, 2016", 4 pgs.

"International Application Serial No. PCT/CN2015/098653, Written Opinion dated Sep. 30, 2016", 3 pgs.

* cited by examiner

UNIVERSAL INTERFACE FOR SENSOR DEVICES

This application is a continuation of U.S. patent application Ser. No. 15/775,423, filed May 11, 2018, which is a U.S. National Stage Filing under 35 U.S.C. 371 from International Application No. PCT/CN2015/098653, filed on Dec. 24, 2015, and published as WO 2017/107123 on Jun. 29, 2017, all of which are incorporated by reference herein in their entirety.

TECHNICAL FIELD

This disclosure relates to interface systems, and more particularly, to a system for providing an interface between applications in a gateway/edge device and sensor devices.

BACKGROUND

As technology continues to advance, electronics are finding their way into previously un-imagined applications. The scope of electronic integration is now expanding into areas where electronic communication was not previously contemplated. Automobiles may inform their owners via electronic communication when service is necessary, appliances may inform their owners when failures occur or may provide efficiency data to their manufacturers, smart meters may notify a utility company of utility usage patterns and misconfiguration problems, seemingly everyday objects, items of clothing, etc. may collect and/or exchange data via one or more forms of communication, etc. All of these "smart" apparatuses are forming what has been referred to as an "Internet of Things" (IoT), wherein commonplace apparatuses and/or systems may now have the ability to communicate about status or errors, to receive remote commands, configurations, updates, etc. With the billions of IoT devices connected to the network, a huge amount of sensor data (e.g., sensor status updates) is generated, which is managed most of the time by a third party backend "cloud."

Most of the above communication occurs via wired or wireless links to the Internet. Currently devices include network capabilities that couple them directly or indirectly to the Internet through a local wireless access point (AP) or a wired router. Some devices like web-enabled video capture equipment (e.g., web-based security cameras) or network cameras (also known as IP cameras) are not optimized to regulate Internet traffic, and may deliver a substantial amount of data (e.g., video capture feeds) directly onto the Internet constantly to enable either a user or a third party (e.g., a security company) to view the video data anytime. While this activity appears beneficial, a consequence of the expansion of IoT is an anticipated increase in Internet traffic. The large amount of video data being piped into the Internet becomes problematic as the number of IoT devices grows. Additionally the video feed will be accompanied by apparatus status data, error data, configuration data, command data, etc., and the existing Internet infrastructure may not be able to handle it. For example, the current IoT market analysis forecasts for 2020 that 40% of all data will come from IoT devices and sensors—nearly reaching 90% of the data created in the world data created in last few years (Cisco Consulting Services, 2014). It is predicted that a total of 129 yottabytes will be generated, of which 41% will come from sensors and 59% from cameras (ABI Research, April 2015). Moreover, interacting with (e.g., receiving data from, transmitting instructions to, etc.) different IoT devices may prove to be problematic in that different IoT devices may communicate using a variety of different communication protocols. Example device-facing protocols to facilitate device interaction may include the Alljoyn® framework developed by the AllSeen Alliance, ZigBee® developed by the Zigbee Alliance, different Wi-Fi® protocols, etc. While the Open Internet Consortium (OIC) has proposed standards for IoT communication, existing device-facing protocols are far from standardized. Instead, device-facing protocols remain completely fluid, and may commonly include different overlapping, but inconsistently accessed, functionality proposed by various vendors. It may take years before device-facing protocols mature to a level of formalization that other standardized protocols maintain (e.g., such as web-facing standards for providing interface and control functionality via the Internet). In the meantime, device facing protocols continue to change, new protocols are released, etc., and the developers of applications that may need to interact with IoT devices are forced to generate new code to take into account the particular nuances of the device access and/or control methodologies that are utilized by each different protocol.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
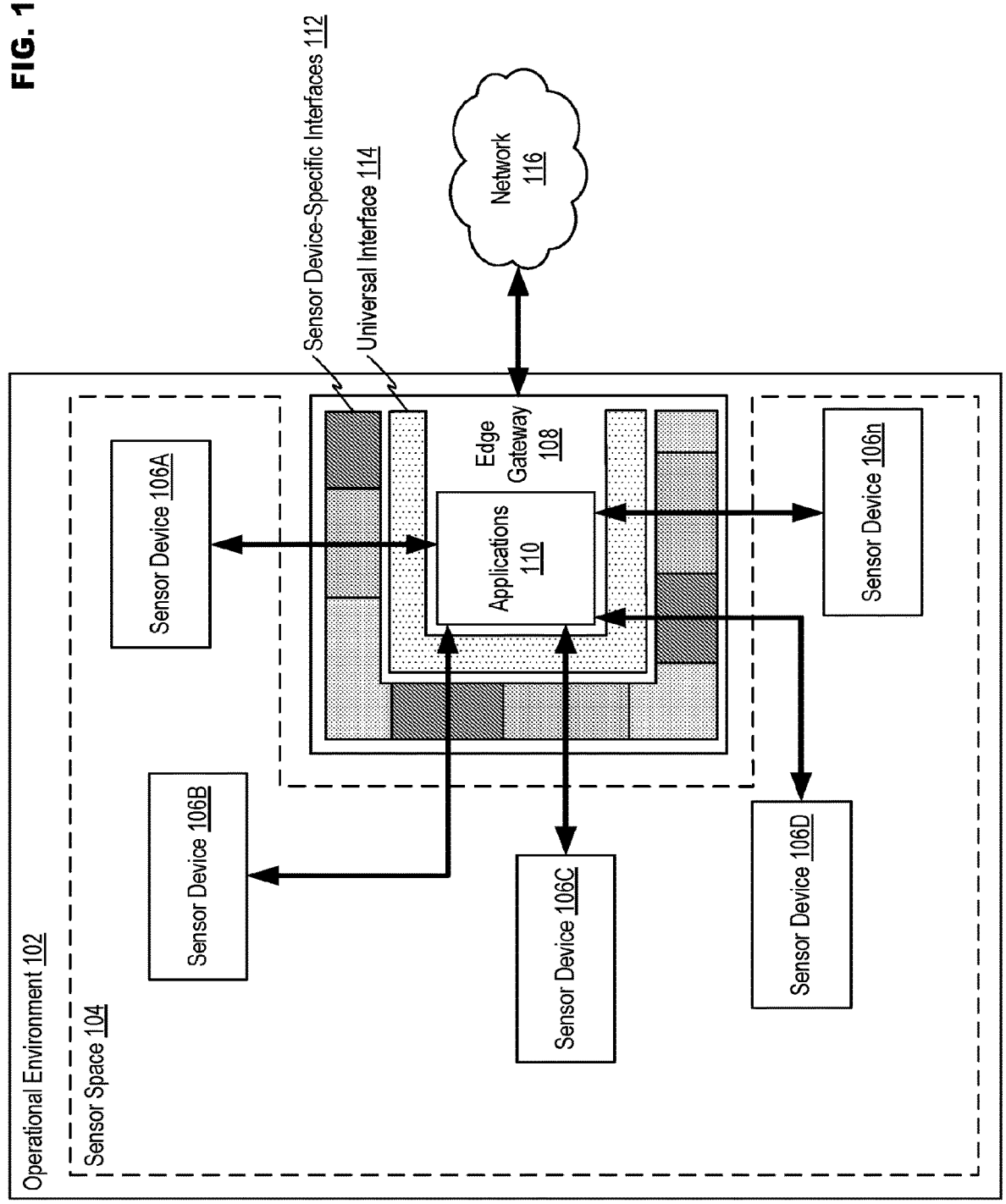
FIG. 1 illustrates an example system employing a universal interface for sensor devices in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

This disclosure is directed to a universal interface for sensor devices. Applications executed in a device may interact with sensor devices via a universal interface. For example, the device may act as a gateway allowing Internet of Things (IoT) devices to interact with at least one resource external to the environment in which the IoT devices operate. The device may comprise at least memory circuitry to store at least a virtual file system and at least one application. The virtual file system may provide a programmatic interface through which at least one sensor device may be accessible to the at least one application. Processing circuitry in the device may execute an application from those stored within the memory circuitry. The application, when executed, may cause interconnect circuitry also in the device to at least one of transmit instructions to, or receive data from, at least one sensor device utilizing the virtual file system.

In at least one embodiment, an example device to operate as at least one of an edge device or gateway may comprise at least interconnect circuitry, memory circuitry and processing circuitry. The interconnect circuitry may be to support communication with at least one sensor device. The memory circuitry may be to store at least a virtual file system and at least one application, wherein the virtual file system is to provide an interface through which the at least one sensor device is accessible to the at least one application. The processing circuitry may be to at least execute an application in the memory circuitry, the application when executed causing the interconnect circuitry to at least one of transmit instructions to, or receive data from, a sensor device utilizing the virtual file system.

In at least one embodiment, the virtual file system may be to route instructions generated by the application utilizing a first communication protocol to a protocol abstraction layer for conversion into a second communication protocol utilized by the sensor device. The virtual file system may further be to route data received from the sensor device via the second communication protocol to the protocol abstraction layer for conversion into the first communication protocol utilized by the application. In at least one example implementation, the memory circuitry may be to store a plurality of applications all utilizing the first communication protocol and the second communication protocol is specific to the sensor device.

In at least one embodiment, the memory circuitry may be to store at least one instruction that, when executed by the processing circuitry, loads a bridge between the virtual file system and a kernel in an operating system also stored in the memory circuitry. In loading the bridge, the processing circuitry may be to load a bridge library accessible to the operating system. The processing circuitry may be to utilize the bridge library to route instructions to the sensor device through a communication protocol specific to the sensor device, and to receive data from the sensor device via the device-specific protocol. The processing circuitry may then be to utilize the interconnect circuitry to transmit instructions to the sensor device based on the device-specific protocol and to receive data from the sensor device based on the device-specific protocol.

In at least one embodiment, the device may be an edge gateway device and the sensor device may be an Internet of Things (IoT) device. The instructions may be to control the sensor device. The data may pertain to information captured by at least one sensor in the sensor device. Consistent with the present disclosure, an example method for operating a device as at least one of an edge device or gateway may comprise loading at least a virtual file system and an application in a device, the virtual file system providing an interface through which the sensor device is accessible to the at least one application and executing the application to cause interconnect circuitry to at least one of transmit instructions to, or receive data from, the sensor device utilizing the virtual file system.

FIG. 1 illustrates an example system to manage IoT devices in accordance with at least one embodiment of the present disclosure. In describing embodiments consistent with the present disclosure, reference may be made to particular technologies such as, for example, IoT, Alljoyn®, ZigBee®, Wi-Fi®, OIC, etc. These examples have been employed to provide a readily comprehensible perspective for understanding the disclosed embodiments, and are not intended to limit implementations to using only these technologies. Discussions of protocols and/or standards within the present disclosure are exemplary, and may be applicable to other related or unrelated versions, parts or sub-parts of the protocol and/or standard including, for example, past and future versions of the same or related protocol(s) and/or standard(s) and/or other protocols and/or standards. In addition, the inclusion of an apostrophe after an item number illustrated in a drawing figure (e.g., 100') is to indicate that an example embodiment corresponding to the item number is being shown. These example embodiments are not intended to limit the disclosure to only what is shown, and are presented merely for the sake of explanation. As referenced herein, IoT devices may generally include addressable connected apparatus or system that does not operate primarily as data processors (e.g., devices including electronic circuitry that may perform data processing but excluding desktops, laptops, tablets, smart phones, etc.) capable of communicating via the Internet. The term "smart" may generally indicate that a device is capable of some level of data processing such as, for example, an IoT device. Examples of IoT devices include, but are not limited to, smart apparatuses such as home appliances, heating, ventilation and air conditioning (HVAC) equipment, office equipment, manufacturing equipment, smart vehicles and systems employed within vehicles, smart video capture equipment such as cameras (e.g., security cameras, standalone cameras based on RealSense depth sensing technology, etc.), smart environmental monitors such as thermometers, smoke detectors, security/motion/intrusion detectors, leak detectors, etc. As referenced herein, "sensor-device specific" may indicate correspondence to a specific device, to a type or category of devices, to all devices configured to operate in a similar manner (e.g., to perform at least one common operation, to use the same communication protocol), etc.

System 100 may comprise, for example, operational environment 102. Operational environment 102 may be a physical area (e.g., a bounded or unbounded outside environment such as a sports field, a structure such as a building or home, a portion of the structure such as a room, a vehicle, etc.), an electronically-defined area (e.g., an area within a wired network, within signal range of a wireless AP, etc.), etc. Operational environment 102 may include sensor space 104. Sensor space 104 may be a physically-defined or electronically defined area within operational environment 102 in which sensor device 106A, sensor device 106B, sensor device 106C, sensor device 106D . . . sensor device 106*n* (collectively, "sensor devices 106A . . . n) and edge gateway (EG) 108 operate. As referenced herein, EG 108 is a device that may operate as at least one of an edge device or a gateway. The total number of sensor devices 106A . . . n is not limited only to what is illustrated in FIG. 1. Less or more sensor devices 106A . . . n may be included in actual implementations. Sensor devices 106A . . . n may comprise, for example, IoT (e.g., smart) devices or other devices comprising sensing capability. Sensing capabilities may include, for example, sensing temperature, illumination (e.g., light/dark), motion (e.g., direction, speed, acceleration, etc.), the presence of an object, the proximity to an object, visual data (e.g., images and/or video), integrity (e.g., contact sensors to monitor window and/or door opening sensors), power (e.g., voltage, current, consumption, efficiency, etc.), etc. EG 108 may operate on the "edge" between sensor space 104 and various resources accessible via network 116 (e.g., a global area network (GAN), a wide area network (WAN) like the Internet, a local area network (LAN), etc.). EG 108 may, in general, coordinate and support the operation of sensor devices 106A . . . n. In performing this function, EG 108 may, for example, receive sensor data from sensor devices 106A . . . n, may analyze the sensor data, may perform at least one activity based on the analysis of the sensor data, may store at least a portion of the sensor data, may interact with external resources via network 116, etc.

EG 108 may comprise a variety of applications 110. Applications 110 may perform, or assist in the performance of, the above operations in regard to sensor devices 106A . . . n. Applications 110 may include, for example, programs, utilities, drivers, stub code, etc. that may monitor and/or control sensor devices 106A . . . n. In performing these operations it may be necessary for some or all of applications 110 to transmit data to, or to receive data from, sensor devices 106A . . . n. Communicating with sensor devices 106A . . . n may be problematic when, for example, each device communicates utilizing a different communication protocol. For example, appliances made by a first manufacturer may utilizing a first communication protocol, sensors (e.g., cameras) from a second manufacturer may communicate utilizing a second communication protocol, etc. This is illustrated in FIG. 1 wherein various sensor device specific interfaces 112 are disclosed for interacting with sensor devices 106A . . . n. Currently, developers must design applications 110 to utilize each of the different interfaces 112 when interacting with each of sensor devices 106A . . . n. Moreover, when interfaces 112 are updated, new interfaces 112 are introduced, etc., applications 110 must also be updated to operate with the updated and/or new interfaces. Having to constantly update applications 110 to keep up with changes to interfaces 112 is a big support burden for application developers.

Consistent with the present disclosure, universal interface 114 may be introduced to provide a standard interface through which applications 110 may interact with sensor devices 106A . . . n. In at least one embodiment, universal interface 114 may comprise a standard set file system, a standard set of function calls, etc., that may be mapped to the corresponding features in sensor device-specific interfaces 112. In this manner, applications 110 may be designed to operate using universal interface 114, which may map data locations, functions, etc. to sensor device-specific interfaces 112 for interacting with sensor devices 106A . . . n. Changes in sensor device-specific interfaces 112 will not affect applications 110 since these changes may be accounted for in the "backside" (e.g., in the data and function mapping) of universal interface 114. Moreover, designers of sensor devices 106A . . . n and/or sensor device-specific interfaces 112 may take into account the design of universal interface 114, and may update and/or release new sensor device-specific interfaces 112 that may integrate with (e.g., be configured to be used with) universal interface 114 in an autonomous or semi-autonomous manner. A detailed example of a file system that may be included in universal interface 112 will be described in regard to FIG. 3.

Figure 2:
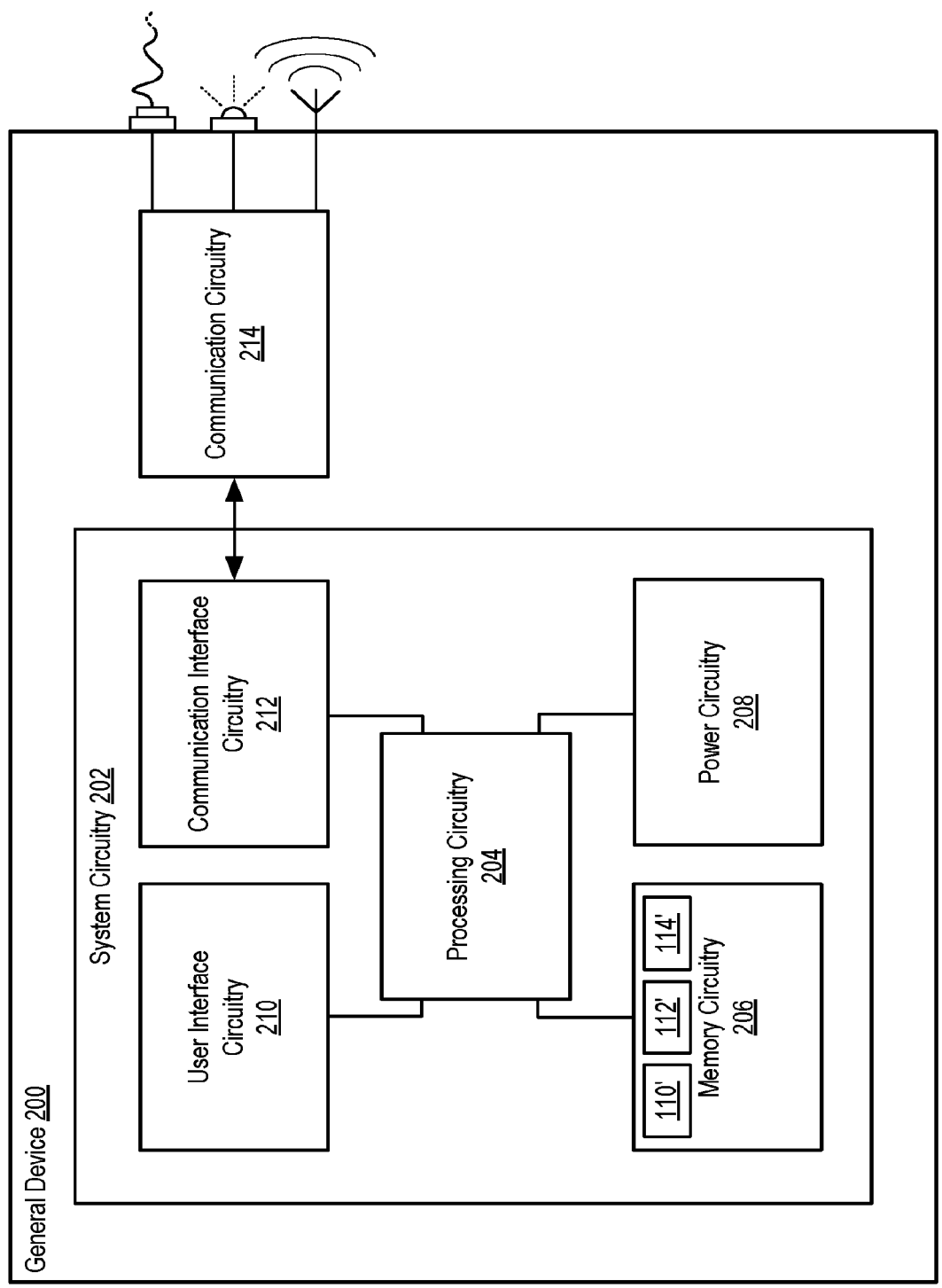
FIG. 2 illustrates an example configuration for a device usable in accordance with at least one embodiment of the present disclosure.

FIG. 2 illustrates an example configuration for a device usable in accordance with at least one embodiment of the present disclosure. General device 200 may be able to perform any or all of the activities shown in FIG. 1 that may be associated with one or both of sensor devices 106A . . . n or EG 108. However, general device 200 is presented only as an example of an apparatus usable in embodiments consistent with the present disclosure, and is not intended to limit any of the embodiments to a particular manner of implementation. While only one general device 200 is illustrated in FIG. 2, it may also be possible for two or more general devices 200, configured to provide similar functionality or different functionality, to operate individually or collaboratively to perform any or all of the activities shown in FIG. 1.

System circuitry 202 may manage the operation of general device 200. System circuitry 202 may include, for example, processing circuitry 204, memory circuitry 206, power circuitry 208, user interface circuitry 210 and communication interface circuitry 212. General device 200 may also comprise communication circuitry 214. While communication circuitry 214 is shown as separate from system circuitry 202, the example illustrated in FIG. 2 is provided merely for the sake of explanation. Some or all of the functionality associated with communication circuitry 214 may be incorporated into system circuitry 202.

In general device 200, processing circuitry 204 may comprise one or more processors situated in separate components, or alternatively one or more processing cores in a single component (e.g., in a System-on-a-Chip (SoC) configuration), along with processor-related support circuitry (e.g., bridging interfaces, etc.). Example processors may include, but are not limited to, various x86-based microprocessors available from the Intel Corporation including those in the Pentium, Xeon, Itanium, Celeron, Atom, Quark, Core i-series, Core M-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing circuitry 204 may interact with other system components that may be operating at different speeds, on different buses, etc. in general device 200. Moreover, some or all of the functionality commonly associated with the support circuitry may also be included in the same physical package as the processor (e.g., such as in the Sandy Bridge, Broadwell and Skylake families of processors available from the Intel Corporation).

Processing circuitry 204 may be configured to execute various instructions in general device 200. Instructions may include program code configured to cause processing circuitry 204 to perform activities related to reading data, writing data, processing data, formulating data, converting data, transforming data, etc. Information (e.g., instructions, data, etc.) may be stored in memory circuitry 206. Memory circuitry 206 may comprise random access memory (RAM) and/or read-only memory (ROM) in a fixed or removable format. RAM may include volatile memory configured to hold information during the operation of general device 200 such as, for example, static RAM (SRAM) or Dynamic RAM (DRAM). ROM may include non-volatile (NV) memory circuitry configured based on BIOS, UEFI, etc. to provide instructions when general device 200 is activated, programmable memories such as electronic programmable ROMs (EPROMS), Flash, etc. Other examples of fixed/removable memory may include, but are not limited to, magnetic memories such as hard disk (HD) drives, electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power circuitry 208 may include, for example, internal power sources (e.g., a battery, fuel cell, etc.) and/or external power sources (e.g., electromechanical or solar generator, power grid, external fuel cell, etc.), and related circuitry configured to supply general device 200 with the power needed to operate. User interface circuitry 210 may include hardware and/or software to allow users to interact with general device 200 such as, for example, various input mechanisms (e.g., microphones, switches, buttons, knobs, keyboards, speakers, touch-sensitive surfaces, one or more sensors configured to capture images, video and/or sense proximity, distance, motion, gestures, orientation, biometric data, etc.) and various output mechanisms (e.g., speakers, displays, lighted/flashing indicators, electromechanical components for vibration, motion, etc.). The hardware in user interface circuitry 210 may be incorporated within general device 200 and/or may be coupled to general device 200 via a wired or wireless communication medium. At least some user interface circuitry 210 may be optional in certain circumstances such as, for example, a situation wherein general device 200 is a very space-limited form factor device (e.g., a small sensor device 106A . . . n), a server (e.g., rack server or blade server), etc. that does not include user interface circuitry 210, and instead relies on another device (e.g., a management terminal) for user interface functionality.

Communication interface circuitry 212 may be configured to manage packet routing and other control functions for communication circuitry 214, which may include resources configured to support wired and/or wireless communications. In some instances, general device 200 may comprise more than one set of communication circuitry 214 (e.g., including separate physical interface circuitry for wired protocols and/or wireless radios) managed by centralized communication interface circuitry 212. Wired communications may include serial and parallel wired mediums such as, for example, Ethernet, USB, Firewire, Thunderbolt, Digital Video Interface (DVI), High-Definition Multimedia Interface (HDMI), Serial Peripheral Interface (SPI), Inter-Integrated Circuit (I2C), 1-wire, etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth, WLAN, Wi-Fi, ZigBee, Z-Wave, etc.), long range wireless mediums (e.g., cellular wide-area radio communication technology, satellite-based communications, etc.), electronic communications via sound waves, optical communications, etc. In one embodiment, communication interface circuitry 212 may be configured to prevent wireless communications that are active in communication circuitry 214 from interfering with each other. In performing this function, communication interface circuitry 212 may schedule activities for communication circuitry 214 based on, for example, the relative priority of messages awaiting transmission. While the embodiment disclosed in FIG. 2 illustrates communication interface circuitry 212 being separate from communication circuitry 214, it may also be possible for the functionality of communication interface circuitry 212 and communication circuitry 214 to be incorporated into the same circuitry.

In at least one embodiment, applications 110', sensor device-specific interfaces 112' and universal interface 114' may be implemented using hardware, or with a combination of hardware and software in general purpose device 200. For example, the various operations associated with these features may be performed directly by the circuitry described in regard to general device 200, or may result when software stored in memory circuitry 206 such as, for example, an application, program, code module, etc. is executed by processing circuitry 204 to transform processing circuitry 204 from general purpose data processing equipment into specialized equipment to perform at least one particular task as directed by the software.

Figure 3:
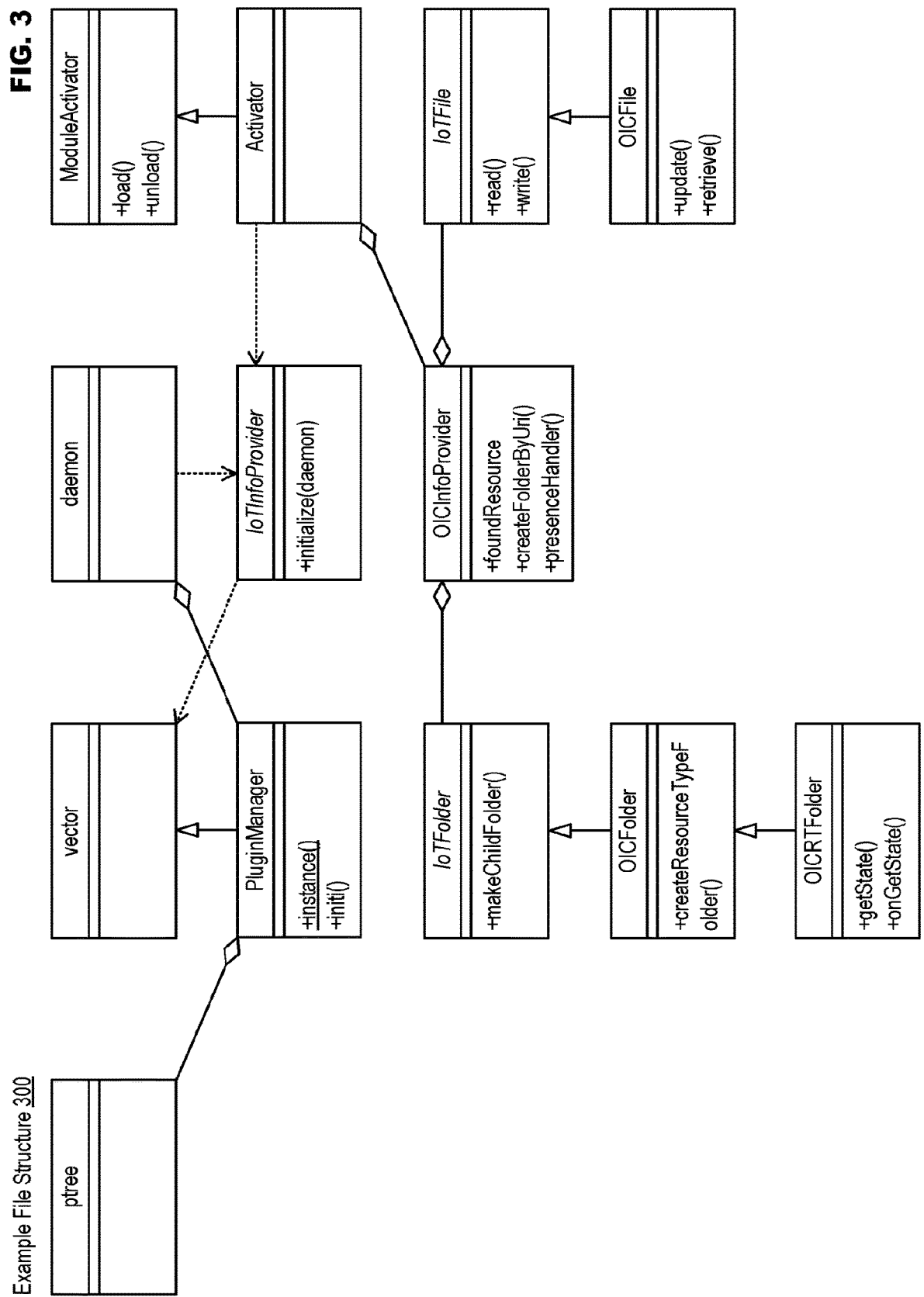
FIG. 3 illustrates an example file system in accordance with at least one embodiment of the present disclosure.

FIG. 3 illustrates an example file system in accordance with at least one embodiment of the present disclosure. In general, a resource management interface for a dynamic and/or distributed, file system may be abstracted in a unified and consistent form to map resources (e.g., devices, sensors, storage, processing units, network interfaces etc.) as directories or files so that they are organized and managed as one distributed filesystem. Existing frameworks, tools and products built upon the filesystem may be transparently workable with least effort. An example structure for IoT file system (IoTFS) 300 is illustrated in FIG. 3. In general, IoTFS 300 may be implemented by choosing a target IoT enumeration and/or control interface to expose via IoTFS 300 (e.g., the OIC communication protocol). A directory/file node mapping may then be designed that creates a 1:1 relationship between the file nodes and the IoT interface points. A filesystem mapping of the directory structure may then be generated. For example, a virtual filesystem using Filesystem in Userspace (FUSE) may be employed similar to how the proc filesystem (procfs) operates in the Unix operating system (OS). While procfs implemented in Unix is provided as an example, other similar filesystems may be used in other operating systems such as, for example, Windows® from the Microsoft Corporation, Mac OS® and OS X® from the Apple Corporation, various implementations of Linux, etc. OS file access controls may then be utilized to gate filesystem directory rights including, for example, which users/applications may control each sensor device 106A . . . n. Application developers may then be allowed to perform operations such as, but not limited to, open, close, read, write, input/output control (ioctl) on the filesystem nodes to actuate device control. For example, IOTFS 300 may translate the filesystem semantics into the underlying IOT device controls. Consistent with the present disclosure, IoTFS 300 may provide suitable abstraction for resource management of dynamic distributed systems (e.g., like IoT) including dynamic insertion/removal of IoT devices, better interoperability with existing framework, tools and products that build upon filesystem application program interfaces (APIs), seamless integration with existing OS or application-level resources, such as security facilities, without a need for re-design or re-implementation, avoid exposing additional libraries by the platform developer or importing libraries by the application developer to enable device control, etc.

For example, the iotfs::IoTInfoProvider may be abstract class which is intended to be inherited by pluggable descendant class for example iotfs::OICInfoProvider, iotfs::IoTFile and iotfs::IoTFolder may be root classes for different file/folder types. An iotfs::OICStub (not pictured) may be used to delegate operations from filesystem call to underlying OIC APIs. At the filesystem mount time, iotfs may register each filesystem information provider derived from iotfs::IoTInfoProvider into a daemon process, and invoke its initialize( ) method. The initialize method may basically setup the required environment and may then query for existing IoT resources (e.g., devices, interfaces, services, etc.) It may also register a required presence handler which may be responsible for handling IoT resource notifications. After all IoT resources have been discovered, the iot::IoTFile or iot::IoTFolder class objects may be instantiated for each resource, with a corresponding iofs::OICStub associated. When a file is read, the +read( ) operation may translate the operation to an OIC get( ) call, and may then retrieve the resource representation. A +write( ) call for a file may, in turn, be translated to an OIC +put( ) call, and will update the resource representation to actually control that resource. Examples of other calls may include, but are not limited to, querying a particular device or sensor could be a combination of 'find' and 'grep' shell command against the filesystem, controlling a device or sensor could be 'echo' a value to designate file, adding a new resource could be 'mount' a new filesystem at existing mount point, setting a parameter for resources could be issue an 'ioctl' API to target file handle, sending a file from one device to another could be 'cp' or 'mv' shell command cross mount points, etc. Moreover, existing facilities built into an OS which have been proven to be effective and secure may remain as is. For example, filesystem access control, 'xattr,' encryption overlay filesystems, etc. may still apply. In addition, 'inotify,' which may be a built-in OS feature, may be used without any special tweak to support notification and/or asynchronous operations from devices to applications built on top of IoTFS.

A difficulty for designing and implementing IoTFS 300 is handling mapping from semantic definitions for various types of IoT standards to a unified filesystem representation. For example, the OIC and AllJoyn communication protocols may both comprise their own schema definition for IoT resources, but IoTFS 300 may conceal those differences from the end user to provide a consistent unified interface. Example implementations of IoTFS 300 use OIC. At least one way to also support AllJoyn is to rely on a software-based AllJoyn to OIC convertor that may be able to convert an AllJoyn resource to an OIC resource. Another possible alternative is to implement the iotfs::AllJoynInfoProvider (not pictured) directly and mapping the semantic defined by AllJoyn standard directly to filesystem concepts.

Another difficulty in designing/implementing IoTFS 300 is to support aggregation of resources viewed using a distributed filesystem. For example, multiple instances of IoTFS 300 may exist across many different network nodes which area physically distributed. A mechanism may be required to couple the instances of IoTFS 300 together to provide a unified interface that allows end users to operate on IoT resources across nodes seamlessly as local resources. At least one implementation under development may mount other instances of IoTFS 300 on other network nodes as local filesystems. While this approach may work, it may not be ideal in certain network situations and may have limited scalability and usability.

Figure 4:
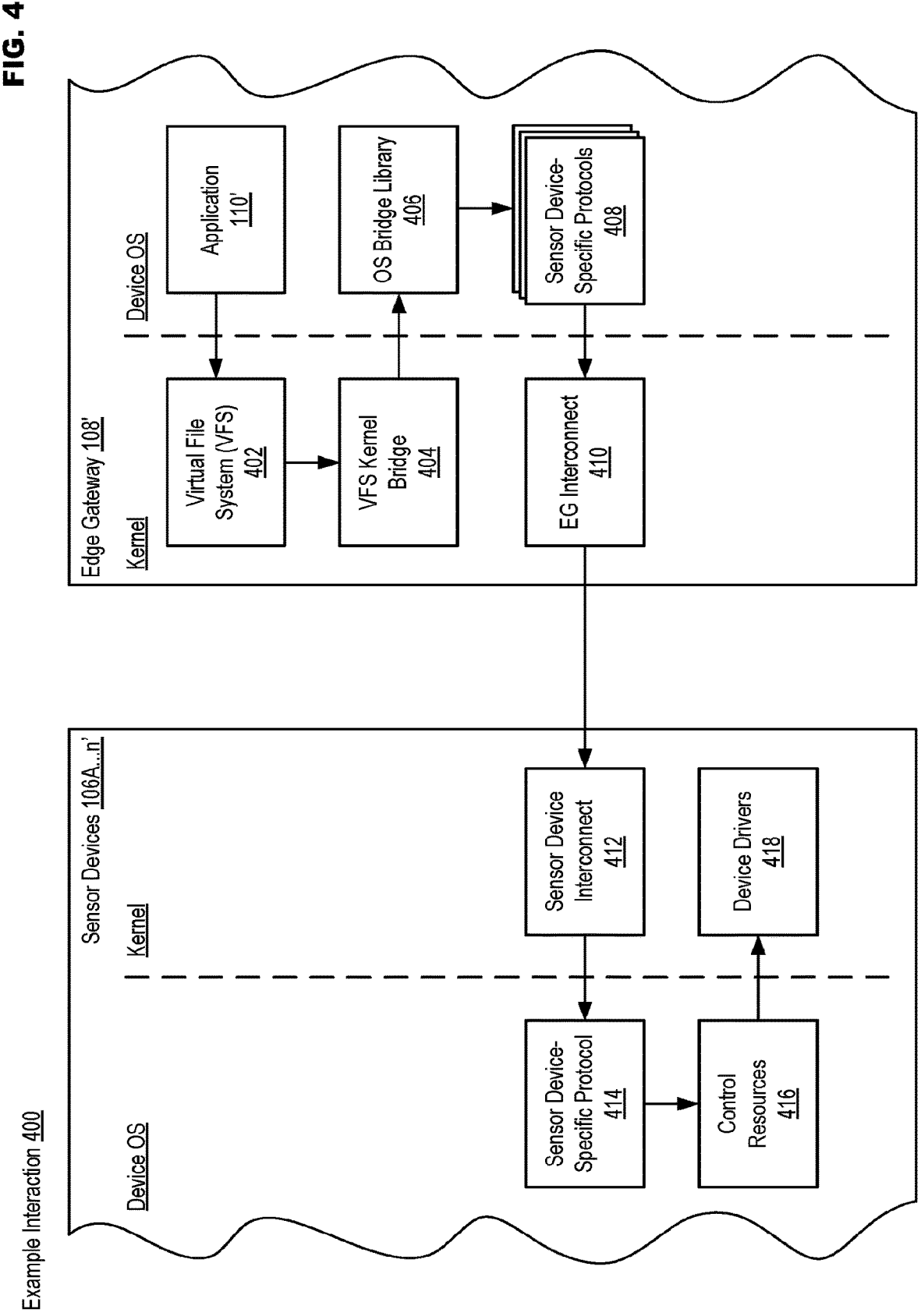
FIG. 4 illustrates an example of interaction between a gateway device and sensor device in accordance with at least one embodiment of the present disclosure.

FIG. 4 illustrates an example of interaction between a gateway device and sensor device in accordance with at least one embodiment of the present disclosure. In general, a filesystem may direct communications to protocol abstraction layer for conversion from an existing protocol (e.g., a protocol utilized by an application in EG 108') to a protocol utilized by the particular destination for the communication (e.g., a protocol utilized by at least one sensor device 106A . . . n'). In the example of FIG. 4, the filesystem may correspond to virtual file system (VFS) 402 and the protocol abstraction layer may correspond to one or all of VFS kernel bridge 404, OS bridge 406 and sensor device-specific protocols 408.

An example interaction 400 is shown between at least one sensor device 106A . . . n' and EG 108'. Each of the devices shown in FIG. 4 may comprise a kernel region and device OS region. The kernel region may correspond to privileged software that may act as an interface between the device OS region and equipment (e.g., hardware, peripherals, etc.) in the device. In an example of operation, at least one application in applications 110' may desire to interact with at least one sensor device 106A . . . n'. Initially, an open and read directory tile system call may be generated to VFS 402. VFS 402 may then route the calls to a corresponding VFS kernel bridge (e.g., FUSE) 404. VFS kernel bridge 404 may reflect the call to an OS bridge library (e.g., libfuse in Userspace) 406. A sensor device-specific protocol (e.g., OIC) 408 may then handle the call details. The sensor device-specific protocol may correspond to the particular communication protocol utilized by the sensor device 106A . . . n' to which the call is intended. The sensor device-specific protocol 408 (e.g., the OIC library) may then transmit a remote procedure call (RPC) to at least one sensor device 106A . . . n' via EG interconnect 410. In at least one embodiment, EG interconnect 410 may be circuitry in communication circuitry 214 as shown in FIG. 2. The transmission may take the form of, for example, a SPI communication, an I2C communication, a Wi-Fi broadcast, etc.

In at least one embodiment, sensor device interconnect 412 may receive the RPC network broadcast from EG 108'. Sensor device-specific protocol 414 (e.g., a sensor device-side OIC component) may then handle the request from application 110'. This may include passing the request to control resources 416, which may interact with device drivers 418 to fulfill the request. For example, the request may involve obtaining data from at least one sensor in at least one sensor device 106A . . . n', affecting control over at least one sensor device 106A . . . n' or a system in which at least one sensor device 106A . . . n' is incorporated, etc. The operations described above may then occur in reverse order to provide a response (e.g., requested data, a command confirmation, etc.) back to the requesting application 110'.

Figure 5:
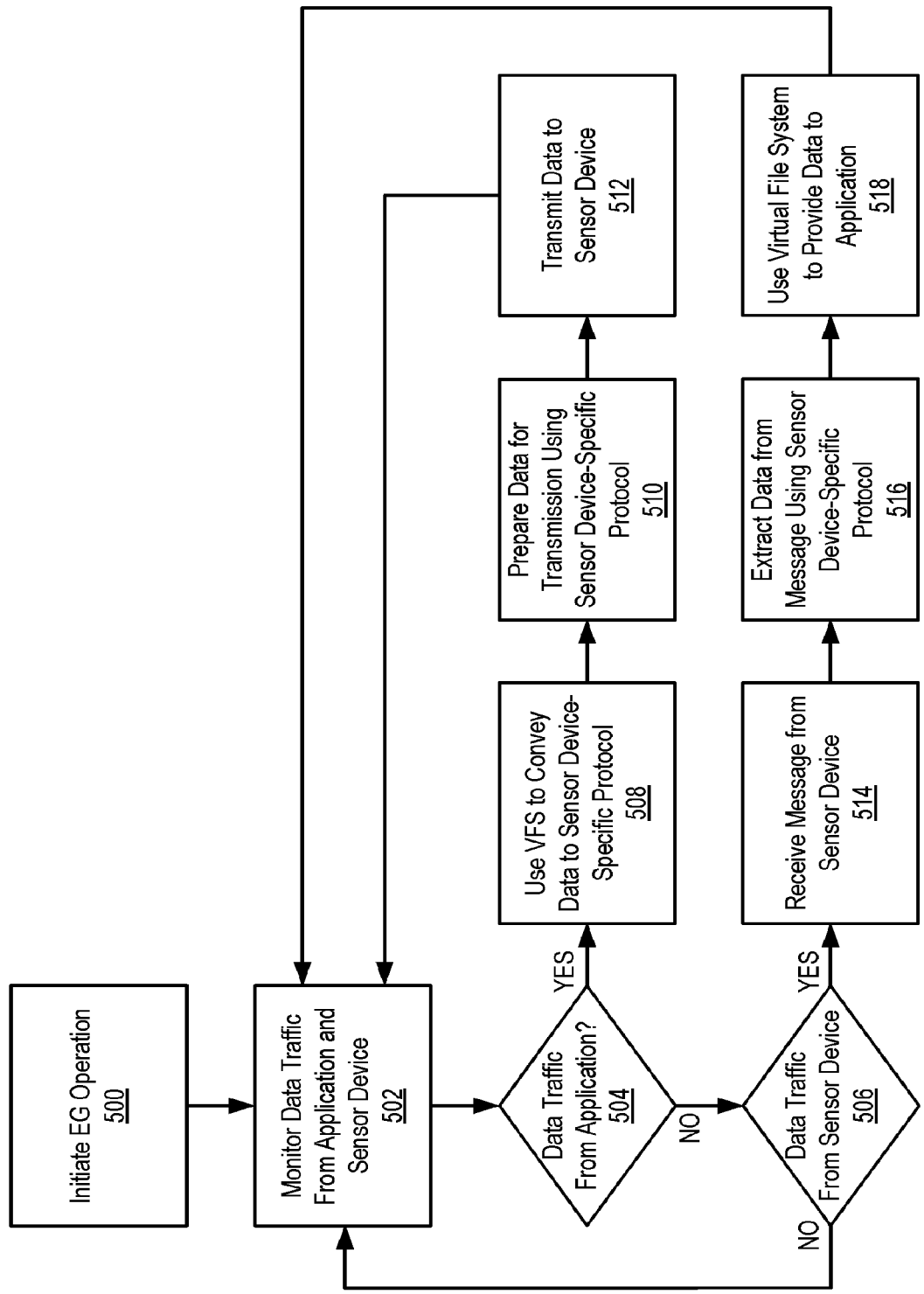
FIG. 5 illustrates example operations that may occur when communicating through a universal interface in accordance with at least one embodiment of the present disclosure.

FIG. 5 illustrates example operations that may occur when communicating through a universal interface in accordance with at least one embodiment of the present disclosure. The operations shown in FIG. 5 represent an example implementation for the sake of explanation. Similar operations in other implementations still consistent with the present disclosure may be performed synchronously, asynchronously, in a different order, etc. EG operation may be initiated in operation 500. In operation 503 application and sensor device data traffic may be monitored. Determinations may then be made in operations 504 and 506 as to whether data traffic is occurring from at least one application or at least one sensor device, respectively. If no data traffic is monitored, then monitoring may continue in operation 502.

If in operation 504 data traffic is monitored from at least one application, then data including, for example, at least one instruction intended for at least one sensor device may be routed to a sensor device-specific protocol (e.g., corresponding to at least one sensor device for which the data in intended) using a virtual file system (VFS) in operation 508. The data may be prepared for transmission utilizing the sensor-device specific protocol in operation 510 and may then be transmitted in operation 512. Operation 512 may be followed by a return to operation 502 to continue data monitoring for the applications and sensor devices.

If in operation 506 data traffic is monitored incoming from at least one sensor device, then in operation 514 a message may be received from at least one sensor device. The data may then be extracted from the received message utilizing a sensor device specific protocol (e.g., corresponding to the sensor device that transmitted the data) in operation 516. The data may then be routed to at least one application for which the data was intended using the VFS in operation 518.

Operation 518 may be followed by a return to operation 502 to continue data monitoring for the applications and sensor devices.

While FIG. 5 illustrates operations according to an embodiment, it is to be understood that not all of the operations depicted in FIG. 5 are necessary for other embodiments. Indeed, it is fully contemplated herein that in other embodiments of the present disclosure, the operations depicted in FIG. 5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, this disclosure is directed to a universal interface for sensor devices. Applications executed in a device may interact with sensor devices via a universal interface. For example, the device may act as a gateway allowing Internet of Things (IoT) devices to interact with at least one resource external to the environment in which the IoT devices operate. The device may comprise at least memory circuitry to store at least a virtual file system and at least one application. The virtual file system may provide a programmatic interface through which at least one sensor device may be accessible to the at least one application. Processing circuitry in the device may execute an application from those stored within the memory circuitry. The application, when executed, may cause interconnect circuitry also in the device to at least one of transmit instructions to, or receive data from, a sensor device utilizing the virtual file system.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system to manage sensor devices.

According to example 1 there is provided a device to operate as at least one of an edge device or gateway. The device may comprise interconnect circuitry to support communication with at least one sensor device, memory circuitry to store at least a virtual file system and at least one application, wherein the virtual file system is to provide an interface through which the at least one sensor device is accessible to the at least one application and processing circuitry to at least execute an application in the memory circuitry, the application when executed causing the interconnect circuitry to at least one of transmit instructions to, or receive data from, a sensor device utilizing the virtual file system.

Example 2 may include the elements of example 1, wherein the virtual file system is to route instructions generated by the application utilizing a first communication protocol to a protocol abstraction layer for conversion into a second communication protocol utilized by the sensor device.

Example 3 may include the elements of example 2, wherein the virtual file system is to route data received from the sensor device via the second communication protocol to the protocol abstraction layer for conversion into the first communication protocol utilized by the application.

Example 4 may include the elements of any of examples 2 to 3, wherein the memory circuitry is to store a plurality of applications all utilizing the first communication protocol and the second communication protocol is specific to the sensor device.

Example 5 may include the elements of any of examples 1 to 4, wherein the memory circuitry is to store at least one instruction that, when executed by the processing circuitry, loads a bridge between the virtual file system and a kernel in an operating system also stored in the memory circuitry.

Example 6 may include the elements of example 5, wherein in loading the bridge the processing circuitry is to load a bridge library accessible to the operating system.

Example 7 may include the elements of example 6, wherein the processing circuitry is to utilize the bridge library to route instructions to the sensor device through a communication protocol specific to the sensor device, and to receive data from the sensor device via the device-specific protocol.

Example 8 may include the elements of example 7, wherein the processing circuitry is to utilize the interconnect circuitry to transmit instructions to the sensor device based on the device-specific protocol and to receive data from the sensor device based on the device-specific protocol.

Example 9 may include the elements of any of examples 1 to 8, wherein the device is an edge gateway device and the sensor device is an Internet of Things (IoT) device.

Example 10 may include the elements of any of examples 1 to 9, wherein the instructions are to control the sensor device.

Example 11 may include the elements of any of examples 1 to 10, wherein the data pertains to information captured by at least one sensor in the sensor device.

Example 12 may include the elements of any of examples 1 to 11, further comprising an interface over which to interact with external resources accessible via a network.

According to example 13 there is provided a method for operating a device as at least one of an edge device or gateway. The method may comprise loading at least a virtual file system and an application in a device, the virtual file system providing an interface through which the sensor device is accessible to the at least one application and executing the application to cause interconnect circuitry to at least one of transmit instructions to, or receive data from, the sensor device utilizing the virtual file system.

Example 14 may include the elements of example 13, and may further comprise routing instructions generated by the application utilizing a first communication protocol to a protocol abstraction layer for conversion into a second communication protocol utilized by the sensor device.

Example 15 may include the elements of example 14, and may further comprise routing data received from the sensor device via the second communication protocol to the protocol abstraction layer for conversion into the first communication protocol utilized by the application.

Example 16 may include the elements of any of examples 14 to 15, wherein a plurality of applications stored in the device all utilize the first communication protocol and the second communication protocol is specific to the sensor device.

Example 17 may include the elements of any of examples 13 to 16, and may further comprise loading a bridge between the virtual file system and a kernel in an operating system in the device.

Example 18 may include the elements of example 17, wherein loading the bridge comprises loading a bridge library accessible to the operating system.

Example 19 may include the elements of example 18, and may further comprise utilizing the bridge library to route instructions to the sensor device through a communication protocol specific to the sensor device and receiving data from the sensor device via the device-specific protocol.

Example 20 may include the elements of example 19, and may further comprise utilizing the interconnect circuitry to transmit instructions to the sensor device based on the device-specific protocol and to receive data from the sensor device based on the device-specific protocol.

Example 21 may include the elements of any of examples 13 to 20, and may further comprise loading a bridge between the virtual file system and a kernel in an operating system in the device and a bridge library accessible to the operating system.

Example 22 may include the elements of any of examples 13 to 21, wherein the instructions are to control the sensor device and the data pertains to information captured by at least one sensor in the sensor device.

According to example 23 there is provided a system including at least one device, the system being arranged to perform the method of any of the above examples 13 to 22.

According to example 24 there is provided a chipset arranged to perform the method of any of the above examples 13 to 22.

According to example 25 there is provided at least one machine readable medium comprising a plurality of instructions that, in response to be being executed on a computing device, cause the computing device to carry out the method according to any of the above examples 13 to 22.

According to example 26 there is provided at least one device capable of operating as at least one of an edge device or gateway, the at least one device being arranged to perform the method of any of the above examples 13 to 22.

According to example 27 there is provided a system for operating a device as at least one of an edge device or gateway. The system may comprise means for loading at least a virtual file system and an application in a device, the virtual file system providing an interface through which the sensor device is accessible to the at least one application and means for executing the application to cause interconnect circuitry to at least one of transmit instructions to, or receive data from, the sensor device utilizing the virtual file system.

Example 28 may include the elements of example 27, and may further comprise means for routing instructions generated by the application utilizing a first communication protocol to a protocol abstraction layer for conversion into a second communication protocol utilized by the sensor device.

Example 29 may include the elements of example 28, and may further comprise means for routing data received from the sensor device via the second communication protocol to the protocol abstraction layer for conversion into the first communication protocol utilized by the application.

Example 30 may include the elements of any of examples 28 to 29, wherein a plurality of applications stored in the device all utilize the first communication protocol and the second communication protocol is specific to the sensor device.

Example 31 may include the elements of any of examples 27 to 30, and may further comprise means for loading a bridge between the virtual file system and a kernel in an operating system in the device.

Example 32 may include the elements of example 31, wherein the means for loading the bridge comprise means for loading a bridge library accessible to the operating system.

Example 33 may include the elements of example 32, and may further comprise means for utilizing the bridge library to route instructions to the sensor device through a communication protocol specific to the sensor device and means for receiving data from the sensor device via the device-specific protocol.

Example 34 may include the elements of example 33, and may further comprise means for utilizing the interconnect circuitry to transmit instructions to the sensor device based on the device-specific protocol and to receive data from the sensor device based on the device-specific protocol.

Example 35 may include the elements of any of examples 27 to 34, wherein the instructions are to control the sensor device and the data pertains to information captured by at least one sensor in the sensor device.

Example 36 may include the elements of any of examples 27 to 35, and may further comprise means for loading a bridge between the virtual file system and a kernel in an operating system in the device and a bridge library accessible to the operating system.

According to example 37 there is provided at least one machine-readable storage medium. The storage medium may have stored thereon, individually or in combination, instructions for operating a device as at least one of an edge device or gateway that, when executed by one or more processors, cause the one or more processors to load at least a virtual file system and an application in a device, the virtual file system providing an interface through which the sensor device is accessible to the at least one application and execute the application to cause interconnect circuitry to at least one of transmit instructions to, or receive data from, the sensor device utilizing the virtual file system.

Example 38 may include the elements of example 37, and may further comprise instructions that, when executed by one or more processors, cause the one or more processors to route instructions generated by the application utilizing a first communication protocol to a protocol abstraction layer for conversion into a second communication protocol utilized by the sensor device.

Example 39 may include the elements of example 38, and may further comprise instructions that, when executed by one or more processors, cause the one or more processors to route data received from the sensor device via the second communication protocol to the protocol abstraction layer for conversion into the first communication protocol utilized by the application.

Example 40 may include the elements of any of examples 38 to 39, wherein a plurality of applications stored in the device all utilize the first communication protocol and the second communication protocol is specific to the sensor device.

Example 41 may include the elements of any of examples 37 to 40, and may further comprise instructions that, when executed by one or more processors, cause the one or more processors to load a bridge between the virtual file system and a kernel in an operating system in the device.

Example 42 may include the elements of example 41, wherein the instructions to load the bridge comprise instructions to load a bridge library accessible to the operating system.

Example 43 may include the elements of example 42, and may further comprise instructions that, when executed by one or more processors, cause the one or more processors to utilize the bridge library to route instructions to the sensor device through a communication protocol specific to the sensor device and receive data from the sensor device via the device-specific protocol.

Example 44 may include the elements of example 43, and may further comprise instructions that, when executed by one or more processors, cause the one or more processors to utilize the interconnect circuitry to transmit instructions to the sensor device based on the device-specific protocol and to receive data from the sensor device based on the device-specific protocol.

Example 45 may include the elements of any of examples 37 to 44, wherein the instructions are to control the sensor device and the data pertains to information captured by at least one sensor in the sensor device.

Example 46 may include the elements of any of examples 37 to 45, and may further comprise instructions that, when executed by one or more processors, cause the one or more processors to load a bridge between the virtual file system and a kernel in an operating system in the device and a bridge library accessible to the operating system.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device to operate as an edge device or a gateway, the device comprising:
    interconnect circuitry to communicate with at least one sensor device;
    memory circuitry to store at least a virtual file system and at least one application, wherein the virtual file system is to provide an interface through which the at least one sensor device is accessible to the at least one application; and
    processing circuitry to at least execute a particular application utilizing a first communication protocol in the memory circuitry and to cause the interconnect circuitry to:
        transmit instructions generated by the particular application from the virtual file system to a protocol abstraction layer, wherein the instructions are transmitted in the first communication protocol to the protocol abstraction layer;
        convert the instructions generated by the particular application into a second communication protocol specific to a particular sensor device of the at least one sensor device using the protocol abstraction layer;
        transmit the converted instructions from the protocol abstraction layer to the particular sensor device;
        receive data at the protocol abstraction layer from the particular sensor device in the second communication protocol specific to the particular sensor; and
        convert the data received from the particular sensor into the first communication protocol using the protocol abstraction layer.

2. The device of claim 1, wherein to convert the instructions includes to convert from a first data schema to a second data schema, and wherein to convert the data includes to convert from the second data schema to the first data schema.

3. The device of claim 1, wherein a remote procedure call is transmitted to the particular sensor device via the interconnect circuitry using the second communication protocol.

4. The device of claim 1, wherein the second communication protocol is used to perform at least one of a Serial Peripheral Interface (SPI) communication, an Integrated Circuit (I2C) communication, or a wireless broadcast.

5. The device of claim 1, wherein the virtual file system is to route the data received from the particular sensor device to the protocol abstraction layer for conversion into the first communication protocol.

6. The device of claim 1, wherein the interconnect circuitry is further to:
    transmit the converted data from the protocol abstraction layer to the particular application in the virtual file system.

7. The device of claim 1, wherein the memory circuitry is to store at least one instruction, that when executed by the processing circuitry, loads a bridge between the virtual file system and a kernel in an operating system, the operating system also stored in the memory circuitry, and wherein in loading the bridge the processing circuitry is to load a bridge library accessible to the operating system.

8. The device of claim 7, wherein the processing circuitry is to utilize the bridge library to route instructions to the sensor device in the second communication protocol.

9. The device of claim 1, wherein the instructions are to control the particular sensor device, and the data pertains to information captured by at least one sensor in the particular sensor device.

10. A method for operating a device as at least one of an edge device or a gateway, the method comprising:
    loading at least a virtual file system and at least one application in memory of the device, the virtual file system providing an interface through which at least one sensor device is accessible to the at least one application; and
    executing a particular application of the at least one application utilizing a first communication protocol to cause interconnect circuitry of the device to:
        transmit instructions generated by the particular application from the virtual file system to a protocol abstraction layer, wherein the instructions are transmitted in the first communication protocol to the protocol abstraction layer;
        convert the instructions generated by the particular application into a second communication protocol specific to a particular sensor device of the at least one sensor device using the protocol abstraction layer;
        transmit the converted instructions from the protocol abstraction layer to the particular sensor device;
        receive data at the protocol abstraction layer from the particular sensor device in the second communication protocol specific to the particular sensor; and
        convert the data received from the particular sensor into the first communication protocol using the protocol abstraction layer.

11. The method of claim 10, wherein to convert the instructions includes to convert from a first data schema to a second data schema; and wherein to convert the data includes to convert from the second data schema to the first data schema.

12. The method of claim 10, wherein a remote procedure call is transmitted to the particular sensor device via the interconnect circuitry using the second communication protocol, and wherein the second communication protocol is used to perform at least one of a Serial Peripheral Interface (SPI) communication, an Integrated Circuit (I2C) communication, or a wireless broadcast.

13. The method of claim 10, wherein the virtual file system is to route the data received from the particular sensor device to the protocol abstraction layer for conversion into the first communication protocol.

14. The method of claim 10, wherein the interconnect circuitry is further to:
    transmit the converted data from the protocol abstraction layer to the particular application in the virtual file system.

15. The method of claim 10, further comprising:
    loading a bridge between the virtual file system and a kernel in an operating system in the device.

16. The method of claim 15, wherein in loading the bridge includes loading a bridge library accessible to the operating system.

17. The method of claim 10, wherein the instructions are to control the particular sensor device, and the data pertains to information captured by at least one sensor in the particular sensor device.

18. At least one non-transitory one machine-readable storage medium having stored thereon, individually or in combination, instructions for operating an edge device or gateway that, when executed by one or more processors of the edge device or gateway, cause the one or more processors to:
    load at least a virtual file system and at least one application in the device, the virtual file system providing an interface through which at least one sensor device is accessible to the at least one application; and
    execute a particular application of the at least one application utilizing a first communication protocol to cause interconnect circuitry to:
        transmit instructions generated by the particular application from the virtual file system to a protocol abstraction layer, wherein the instructions are transmitted in the first communication protocol to the protocol abstraction layer;
        convert the instructions generated by the particular application into a second communication protocol specific to a particular sensor device of the at least one sensor device using the protocol abstraction layer;
        transmit the converted instructions from the protocol abstraction layer to the particular sensor device;
        receive data at the protocol abstraction layer from the particular sensor device in the second communication protocol specific to the particular sensor; and
        convert the data received from the particular sensor into the first communication protocol using the protocol abstraction layer.

19. The storage medium of claim 18, wherein to convert the instructions includes to convert from a first data schema to a second data schema, and wherein to convert the data includes to convert from the second data schema to the first data schema.

20. The storage medium of claim 18, wherein the virtual file system is to route the data received from the particular sensor device to the protocol abstraction layer for conversion into the first communication protocol.

21. The storage medium of claim 18, wherein the interconnect circuitry is further to:
    transmit the converted data from the protocol abstraction layer to the particular application in the virtual file system.

22. The storage medium of claim 18, wherein a remote procedure call is transmitted to the particular sensor device via the interconnect circuitry using the second communication protocol, and wherein the second communication protocol is used to perform at least one of a Serial Peripheral Interface (SPI) communication, an Integrated Circuit (I2C) communication, or a wireless broadcast.

23. The storage medium of claim 18, wherein the instructions further cause the processor to:
    load a bridge between the virtual file system and a kernel in an operating system in the device.

24. The storage medium of claim 23, wherein the instructions to load the bridge include instructions to load a bridge library accessible to the operating system.

25. The storage medium of claim 18, wherein the instructions are to control the particular sensor device, and the data pertains to information captured by at least one sensor in the particular sensor device.

* * * * *

UNITED STATES PATENT AND TRADEMARK OFFICE
CERTIFICATE OF CORRECTION

PATENT NO. : 11,463,273 B2
APPLICATION NO. : 17/495426
DATED : October 4, 2022
INVENTOR(S) : Li et al.

It is certified that error appears in the above-identified patent and that said Letters Patent is hereby corrected as shown below:

In the Claims

In Column 17, Line 42, in Claim 11, delete "schema;" and insert --schema,-- therefor Signed and Sealed this
Eighteenth Day of July, 2023

Katherine Kelly Vidal
*Director of the United States Patent and Trademark Office*